United States Patent
Carlos et al.

(10) Patent No.: US 10,609,135 B2
(45) Date of Patent: Mar. 31, 2020

(54) USER PRESENCE DETECTION AND DISPLAY OF PRIVATE CONTENT AT A REMOTE COLLABORATION VENUE

(71) Applicant: PRYSM, INC., San Jose, CA (US)

(72) Inventors: Dino Carlos, Fishers, IN (US); Adam P. Cuzzort, Westfield, IN (US); Brandon Fischer, Carmel, IN (US)

(73) Assignee: PRYSM, INC., San Jose, CA (US)

( * ) Notice: Subject to any disclaimer, the term of this patent is extended or adjusted under 35 U.S.C. 154(b) by 79 days.

(21) Appl. No.: 15/182,520

(22) Filed: Jun. 14, 2016

(65) Prior Publication Data

US 2016/0373522 A1    Dec. 22, 2016

Related U.S. Application Data

(60) Provisional application No. 62/180,383, filed on Jun. 16, 2015.

(51) Int. Cl.
*H04L 29/08*     (2006.01)
*G06Q 10/10*     (2012.01)

(52) U.S. Cl.
CPC .......... *H04L 67/104* (2013.01); *G06Q 10/10* (2013.01); *H04L 67/18* (2013.01)

(58) Field of Classification Search
CPC ........ H04L 67/104; H04L 67/18; G06Q 10/10
See application file for complete search history.

(56) References Cited

U.S. PATENT DOCUMENTS

| | | | | |
|---|---|---|---|---|
| 6,049,334 A * | 4/2000 | Bates | ................... | G06F 3/0481 |
| | | | | 715/745 |
| 9,740,361 B2 * | 8/2017 | Tan | ....................... | G06F 3/0481 |
| 2007/0067852 A1* | 3/2007 | James | .................... | G06F 21/35 |
| | | | | 726/28 |
| 2014/0108544 A1* | 4/2014 | Lewis | ................... | H04W 4/026 |
| | | | | 709/204 |
| 2016/0110585 A1* | 4/2016 | Govindaraj | ............ | G06Q 30/02 |
| | | | | 382/118 |

OTHER PUBLICATIONS

"iBeacon", Wikipedia, 7 pages, https://en.wikipedia.org/wiki/IBeacon.

* cited by examiner

*Primary Examiner* — Viet D Vu
(74) *Attorney, Agent, or Firm* — Artegis Law Group, LLP

(57) ABSTRACT

A computer-implemented method for managing a collaboration environment comprises receiving sensor information from one or more sensors disposed at a first collaboration venue indicating that a first user is present within the first collaboration venue, receiving sensor information from one or more sensors disposed at a second collaboration venue indicating that a second user is present within the second collaboration venue, identifying the first user based on the sensor information received from the first collaboration venue, identifying the second user based on the sensor information received from the second collaboration venue, and executing one or more actions with respect to a third collaboration venue based on at least one of the information from one or more sensors disposed at the first collaboration venue and the sensor information from one or more sensors disposed at the second collaboration venue.

25 Claims, 9 Drawing Sheets

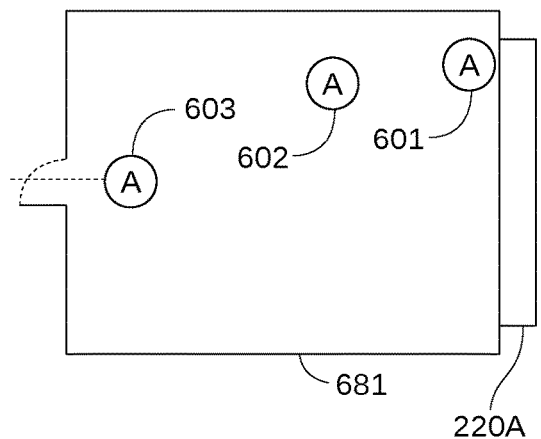
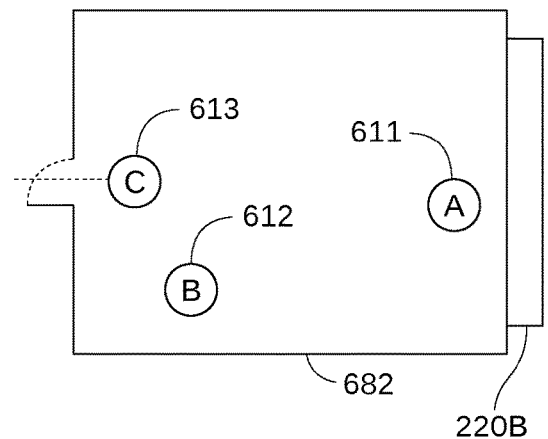
FIG. 6A  FIG. 6B
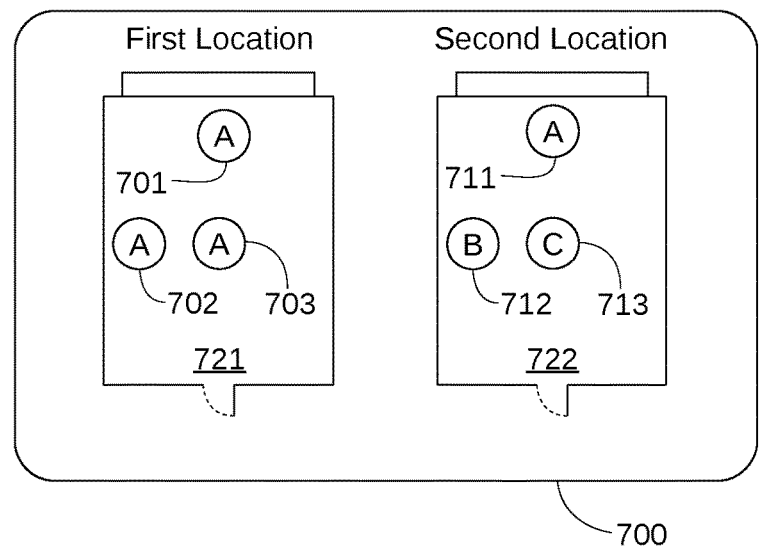
FIG. 7

USER PRESENCE DETECTION AND DISPLAY OF PRIVATE CONTENT AT A REMOTE COLLABORATION VENUE

CROSS-REFERENCE TO RELATED APPLICATIONS

This application claims priority to U.S. provisional patent application titled, "SENSOR-BASED COLLABORATION AND FILE SHARING," filed on Jun. 16, 2015 and having Ser. No. 62/180,383. The subject matter of this related application is hereby incorporated herein by reference.

BACKGROUND OF THE INVENTION

Field of the Invention

Embodiments of the present invention relate generally to the presentation of information in collaborative environments and, more specifically, to the display of private content at a remote collaboration venue.

Description of the Related Art

Large multi-touch display walls combine the intuitive interactive capabilities of touch-screen technology with the immersive display features of large screens. Large multi-touch display walls allow presenters to display a multitude of visual and audio-visual assets, such as images, videos, documents, and presentation slides, and also interact with these assets by touching them. Touch or gesture-based interactions may include dragging assets to reposition them on the screen, tapping assets to display or select menu options, swiping assets to page through documents, or using pinch gestures to resize assets. Via such interactions, multi-touch display walls facilitate more flexible and emphatic presentations of various materials to audiences, for example by annotating written or image content in an asset, starting and stopping a video in an asset, etc.

In addition to enabling content-rich presentations, such display walls can facilitate communication and collaborative work between remotely located parties. For example, when two remotely located collaboration venues are each equipped with a multi-touch display wall, collaboration between the two venues can be conducted in real-time, thereby leveraging the input and creativity of multiple parties, regardless of location.

One drawback to remotely displaying content for collaborative work between different locations is the inability to track distributed participation and who is in a remote collaboration venue. This inability causes several issues. First, users generally like to know who they are communicating with in collaborations and, more importantly, who is listening to them when they speak or present information. People simply do not like surprises. Second, without an understanding of who is present in a collaboration, the experience cannot be modified or optimized for particular participants. For example, how content is displayed on an endpoint display at a particular location may differ depending on whether there is only one participant viewing the content at that location or several. Finally, there is reduced overall security when the participants in a collaboration are unknown.

With respect to security, some persons may not be authorized to hear or discuss certain topics or subject matter areas. Participants need to understand who is present at all venues in a collaboration before speaking or discussing more sensitive matters. In addition, there is reduced content security when all of the participants of a collaboration are unknown or not properly identified. That is, an individual in one collaboration venue who wants to share sensitive information via the multiple-touch display wall or other display may not know who is present in the various remote collaboration venues or whether persons in those remote locations are authorized to see or hear the sensitive information being presented. Consequently, the materials presented in collaborative meetings are oftentimes limited to content that has no privacy constraints associated therewith, which can overly constrain the scope of such meetings and undermine the effectiveness of remote collaborations.

As the foregoing illustrates, what is needed are more effective techniques for displaying sensitive content during collaborations involving remote venues.

SUMMARY OF THE INVENTION

One embodiment of the present invention sets forth a computer-implemented method for managing a collaboration environment. The method includes receiving sensor information from one or more sensors disposed at a first collaboration venue indicating that a first user is present within the first collaboration venue, receiving sensor information from one or more sensors disposed at a second collaboration venue indicating that a second user is present within the second collaboration venue, identifying the first user based on the sensor information received from the first collaboration venue, identifying the second user based on the sensor information received from the second collaboration venue, and executing one or more actions with respect to a third collaboration venue based on at least one of the information from one or more sensors disposed at the first collaboration venue and the sensor information from one or more sensors disposed at the second collaboration venue.

At least one advantage of the disclosed embodiment is that collaborative work at remote locations can be performed on sensitive content with much less risk of exposure to unauthorized users.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6A schematically illustrates a collaboration venue associated with one collaboration system clients of FIG. 1, according to various embodiments of the present invention;

FIG. 6B schematically illustrates a collaboration venue associated with another collaboration system client of FIG. 1, according to various embodiments of the present invention;

FIG. 7 illustrates a participant map that may be displayed as an asset within a collaboration workspace, according to various embodiments of the present invention;

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

Figure 1:
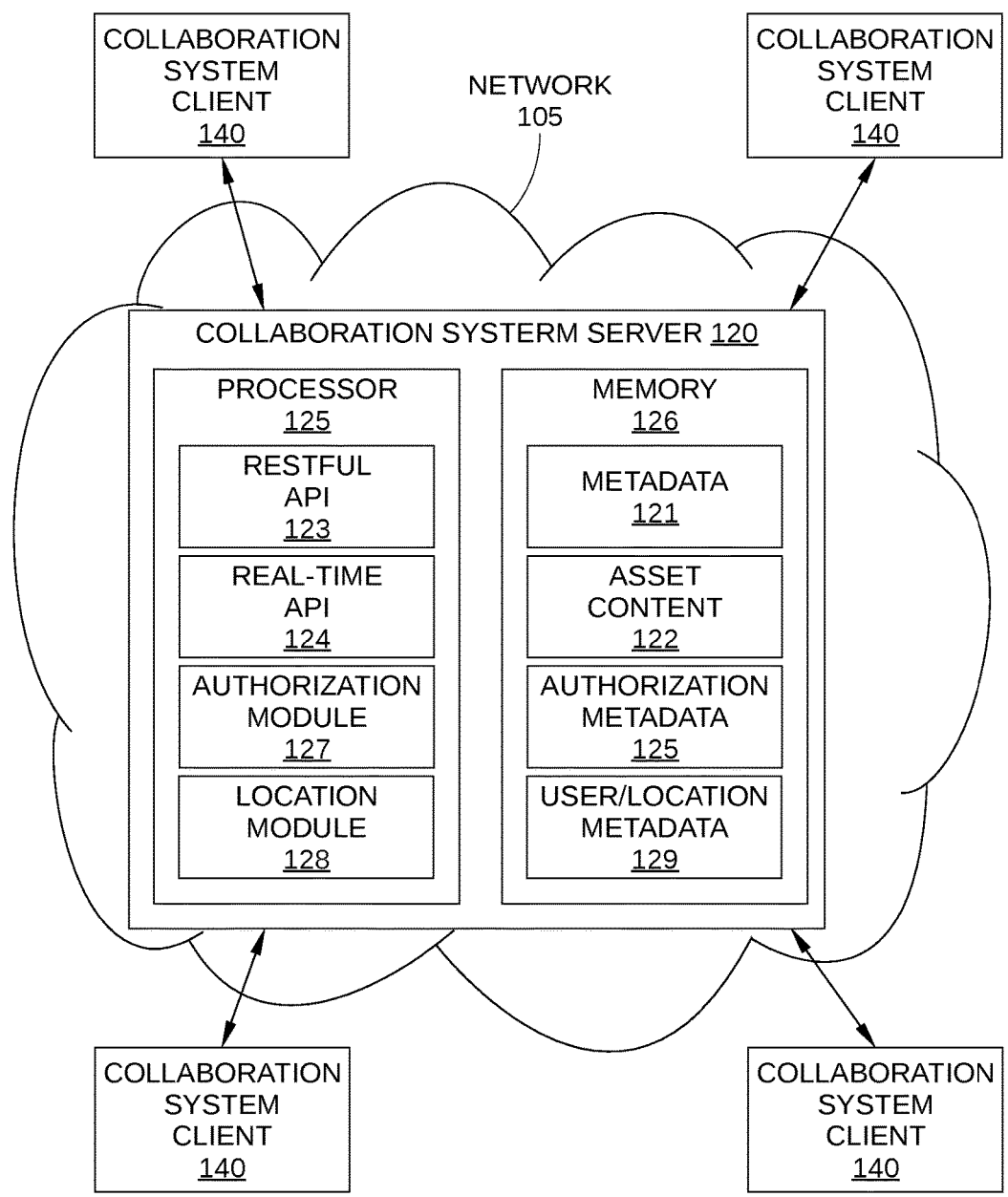
FIG. 1 is a block diagram of a multi-media collaboration environment configured to implement one or more aspects of the present invention.

FIG. 1 is a block diagram of a collaboration environment 100 configured to implement one or more aspects of the present invention. Collaboration environment 100 is a multimedia collaboration platform configured to provide an interface to multiple users at multiple locations for interacting with displayed content and each other, and for collaboratively modifying the displayed content. Collaboration environment 100 may include a collaboration server 120 and a plurality of collaboration system clients 140, communicatively connected via a network 105. Network 105 may be any technically feasible communications or information network, wired or wireless, that allows data exchange, such as a wide area network (WAN), a local area network (LAN), a wireless (WiFi) network, and/or the Internet, among others. In some embodiments, collaboration server 120 may include, without limitation, asset metadata 121, asset content 122, a representational state transfer (REST) compliant (or RESTful) application program interface (API) 123, a real-time API 124, authorization metadata 125, an authorization module 127, user/location metadata 129, and a location module 128, each described below.

Collaboration server 120 may include a processor 125 and a memory 126. Processor 125 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processor 125 may be any technically feasible hardware unit capable of processing data and/or executing software applications, including authorization module 127 and location module 128, described below, or any other user authorization algorithm or user/location management algorithm. Memory 126 may include a volatile memory, such as a random access memory (RAM) module, and non-volatile memory, such as a flash memory unit, a read-only memory (ROM), one or more hard disk drives, or any other type of memory unit or combination thereof suitable for use in collaboration server 120. Memory 126 is configured to store any software programs, operating system, drivers, and the like, that facilitate operation of collaboration server 120, including authorization module 127 and/or user location module 128, such as authorization metadata 125 and user/location metadata 129. Further, in the context of this disclosure, the computing elements shown in collaboration server 120 may correspond to a physical computing system (e.g., a system in a data center) or may be a virtual computing instance executing within a computing cloud.

Collaboration server 120 coordinates the flow of information between the various collaboration system clients 140. Thus, in some embodiments, collaboration server 120 is a streaming server for collaboration system clients 140. In addition, collaboration server 120 receives requests from collaboration system clients 140 and can send notifications to collaboration system clients 140. Therefore, there is generally a two-way connection between collaboration server 120 and each of collaboration system clients 140. In such embodiments, RESTful API 123 is the endpoint for collaboration system clients 140. Alternatively or additionally, collaboration system clients 140 may make requests on collaboration server 120 through RESTful API 123. For example, during collaborative work on a particular project via collaboration environment 100, a collaboration system client 140 may send a request to collaboration server 120 for information associated with an interactive window asset to display the asset in a workspace of the particular project.

An interactive window asset, or "asset," may be any interactive renderable content that can be displayed on a display surface of collaboration system client 140. In some embodiments, the asset may be displayed within a dynamically adjustable presentation window. For simplicity, an asset and corresponding dynamically adjustable presentation window are generally referred to herein as a single entity, i.e., an "asset." Assets may include application environments, images, videos, web browsers, documents, mirroring or renderings of laptop screens, presentation slides, any other graphical user interface (GUI) of a software application, and the like. An asset generally includes at least one display output generated by a software application, such as a GUI of the software application or some other renderable content associated with the software application.

An asset may be configured to receive one or more software application inputs via a gesture-sensitive display surface of a collaboration system client 140, i.e., inputs received via the gesture-sensitive display surface are received by the asset and treated as input for the software application associated with the asset. Alternatively or additionally, an asset may be configured to receive one or more software application inputs via a pointing device, such as a mouse. In either case, unlike a fixed image, an asset may be a dynamic element that enables interaction with the software application associated with the asset, for example, for manipulation of the asset. Thus, an asset may not simply be displayed content such as a presentation slide or image. For example, in some embodiments, an asset may include select buttons, pull-down menus, control sliders, etc. that are associated with the software application, and can provide inputs to the software application via the display surface.

Alternatively or additionally, in some embodiments annotations may be made to an asset when displayed.

A workspace is a digital canvas on which assets associated therewith are displayed within a suitable dynamic presentation window on a display surface of one or more collaboration system clients 140, such as a gesture-sensitive display surface. Typically, a workspace corresponds to the all of the potential render space of a collaboration system client 140, so that only a single workspace can be displayed on the surface of a gesture-sensitive display surface of the collaboration system client 140. However, in some embodiments, multiple workspaces may be displayed on a gesture-sensitive display surface concurrently, such as when a workspace does not correspond to the entire gesture-sensitive display surface. Assets associated with a workspace are typically displayed in the workspace within a suitable presentation window that has user-adjustable display height, width, and location. Generally, a workspace is associated with a particular project, which is typically a collection of multiple workspaces.

In some embodiments, collaboration server 120 may receive information from one collaboration system client 140 that indicates arrival and/or departure of particular users, and then disseminates such information to the remaining collaboration system client 140. Thus, as users are collaboratively working on and viewing a particular workspace, the users present at one collaboration venue can view each other collaboration system client 140 via a display asset. In addition, collaboration server 120 may send information to each collaboration system client 140 that indicates what assets of the current workspace can be displayed and/or played based on what users are present. Generally, collaboration server 120 determines such information based on authorization requirements for a particular asset and on the authorization level of each user present at the collaboration venue of each other collaboration system client 140. In some embodiments, the authorization requirements for a particular asset and the authorization level of each user are included in asset metadata 121. The collaboration venue may be any space that includes at least one collaboration system client 140 that may be connected via a collaboration system server 120. The space may be a room with one or more dedicated entrance/exits, a region within a room, which may have variable entrance/exits, or any space that comprises a collaboration system server 120 connected collaboration system client 140. One or more of these spaces may comprise a collaboration session.

Database server 120 stores asset metadata 121, authorization metadata 125, and user/location metadata, all associated with collaboration environment 100. Asset metadata 121 includes metadata for specific assets, workspaces, and/or projects. For example, such metadata may include which assets are associated with a particular workspace, which workspaces are associated with a particular project, the state of various setting for each workspace, annotations made to specific assets, etc. In some embodiments, asset metadata may also include a size of the presentation window associated with the asset and position of the presentation window in a particular workspace. Authorization metadata 125 generally includes an authorization requirement for each specific asset associated with collaboration environment 100, where a user is authorized to view and/or hear a specific asset when a credential associated with the user satisfies the authorization requirement.

For example, in some embodiments, an authorization requirement included in authorization metadata 125 for a particular asset may be the inclusion of the user on a list of authorized users. In such embodiments, authorization metadata 125 may include a list of specific users that are authorized to view, hear, and/or edit the asset. In such embodiments, authorization metadata 125 may further include identification and/or authentication metadata to facilitate identification and/or authentication of a users included in the list of authorized asset users, such as: an employee number entered by the user or detected by, for example, a badge reader associated with a particular collaboration system client 140; a physical attribute or inherence factor determined by a particular collaboration system client 140, such as a fingerprint, retinal scan, facial recognition image, and/or other biometric parameters; metadata associated with a particular possession or token linked to users included in the list of authorized asset users, such as a cell phone number, subscriber identity module (SIM) card number, or token generator secret key; and the like. Thus, in such embodiments, authorization metadata 125 may include a lookup table or other mapping between users and assets, so that once a user is identified, a lookup can be performed for each asset currently displayed by the collaboration system client 140, and the determination can be made whether the asset can continue to be displayed. Generally, such a lookup is performed by authorization module 127.

In another example, in some embodiments, an authorization requirement included in authorization metadata 125 for a particular asset may include one or more authorized user attributes or authorized user categories. In such embodiments, any user that is identified and confirmed to have a particular authorizing attribute or belong to a particular authorized category of user may be considered an authorized user. For example, an authorized user attribute may include having a particular status, such as a predetermined security clearance level, being a full-time employee, display or interaction preferences, being located in a particular location or using a particular collaboration system client 140, etc.

As described above, authorization requirements included in authorization metadata 125 may be associated with a particular asset. Alternatively or additionally, authorization metadata 125 may associated with a particular user. For example, authorization metadata 125 may include a user profile for some or all users, where each user profile includes a list of assets that the particular user is authorized to see, hear and/or edit. Thus, in some embodiments, authorization metadata 125 may include a lookup table or other mapping between users and assets, so that before an asset is displayed at a particular collaboration system client 140, the determination can be made whether the asset is included in the user profile of each user at that particular collaboration system client 140. Otherwise, the asset is not displayed at that particular collaboration system client 140.

Asset content 122 includes the content of assets associated with collaboration environment 100, such as files, as documents, images, and videos. Generally, requests for asset content 122 are received from collaboration system clients 140. For example, an asset, such as a word-processing document, may be associated with a workspace that is displayed on the respective gesture-sensitive display surfaces of first and second collaboration system clients 140. When the asset is modified by a user at the first collaboration system client 140, asset content associated with the asset is updated in asset content 122, the second collaboration system client 140 downloads the updated asset content 122 from collaboration server 120, and the asset is then displayed, as updated, on the gesture-sensitive display surface of the second collaboration system client 140. Alternatively, when the asset is modified by a user at the first collaboration system client 140, metadata for a file associated with the asset is updated in collaboration server 120, the second collaboration system client 140 downloads the updated metadata for the file from collaboration server 120, and the asset is then displayed, as updated based on this metadata, on the gesture-sensitive display surface of the second collaboration system client 140.

RESTful API 123 may be any technically feasible RESTful API that facilitates communications from collaboration system clients 140. For example, in some embodiments, RESTful API 123 employs hypertext transfer protocol (HTTP) as a transport layer. Real-time API 124 may be any technically feasible messaging API that provides a push notification to collaboration system clients 140. Thus, rather than collaboration system clients 140 polling collaboration server 120 for information, real-time API 124 pushes such information to all the clients. For example, collaboration server 120 may send to each collaboration system client 140 what users are currently located at each collaboration system client 140, the authorization level of each such user, and the like, so that all users at all collaboration system clients 140 are aware that a particular user has arrived or departed. This information may be used by each collaboration system client 140 to update the displayed user interface for that particular collaboration system client 140.

In one or more embodiments, user/location metadata 129 may include, for each collaboration system client 140 within a common collaboration (which can span multiple collaboration venues), an inventory of display devices associated with the collaboration system client 140. In one or more embodiments, for each collaboration system client 140 within a common collaboration, user/location metadata 129 may indicate the users currently detected in a collaboration venue associated with the collaboration system client 140. In one or more embodiments, user/location metadata 129 may include identification information associated with each user within each collaboration venue and/or a total user count of users within each collaboration venue in the common collaboration. In one or more embodiments, user/location metadata 129 may include an expected number of users in a particular collaboration venue, the one or more display or interactive displays 220 as well as their sizes, and/or a total number of collaboration users within a collaboration. In one or more embodiments, user/location metadata 129 may include expected identifying information of users in a common collaboration. In one or more embodiments the collaboration server stores the expected identifying information of users for each collaboration venue within a collaboration. As described herein, in such embodiments, for a particular common collaboration, collaboration server 120 can correlate the stored expected identifying information of users with those users currently detected for each collaboration venue participating in the common collaboration. Expected identifying information of users may include a minimum or maximum number of participants for the entire collaboration, number of participants per a particular one or more collaboration venues, the minimum or maximum participant member categories or member within a category, or the actual participant identities at one or more collaboration venues. Expected identifying information of users may further include one of multiple identification credentials associated with a single user, where for example an image of a user may be further verified with an RFID credential, biometric credential, cell phone credential, hand-writing samples, or any other forms of identifying information associated with a particular user. Expected identifying information of users may further include correlated information about the user, for example format, font size, brightness, layout or other user identified preferences.

In some embodiments, the functionality of collaboration server 120 may be implemented, as shown, as a single computing structure in a single location. Alternatively, the functionality of collaboration server 120 may be implemented as separate and distinct computing structures that are coupled to each other and to collaboration system clients 140 via a network 105. For example, in one such embodiment, asset metadata 121 may be stored in one computing structure, such as a database server, asset content 122 may be stored in another computing structure, such as a file server, and RESTful API 123 and real-time API 124 may be running in yet another computing structure, such as an authorization server. Furthermore, the functionality of collaboration server 120 may be implemented in any other technically feasible combination of computing structures and/or distributed computing systems.

Each of collaboration system clients 140 is an instance of a collaborative multi-media platform disposed at a different location in collaboration environment 100, such as a collaboration venue. Each collaboration system client 140 is configured to provide a digital system that can be mirrored at one or more additional and remotely located collaboration system clients 140. Thus, collaboration system clients facilitate the collaborative modification of assets, workspaces, and/or complete presentations or other projects, as well as the presentation thereof. One embodiment of a collaboration system client 140 is described below in conjunction with FIG. 2.

Figure 2:
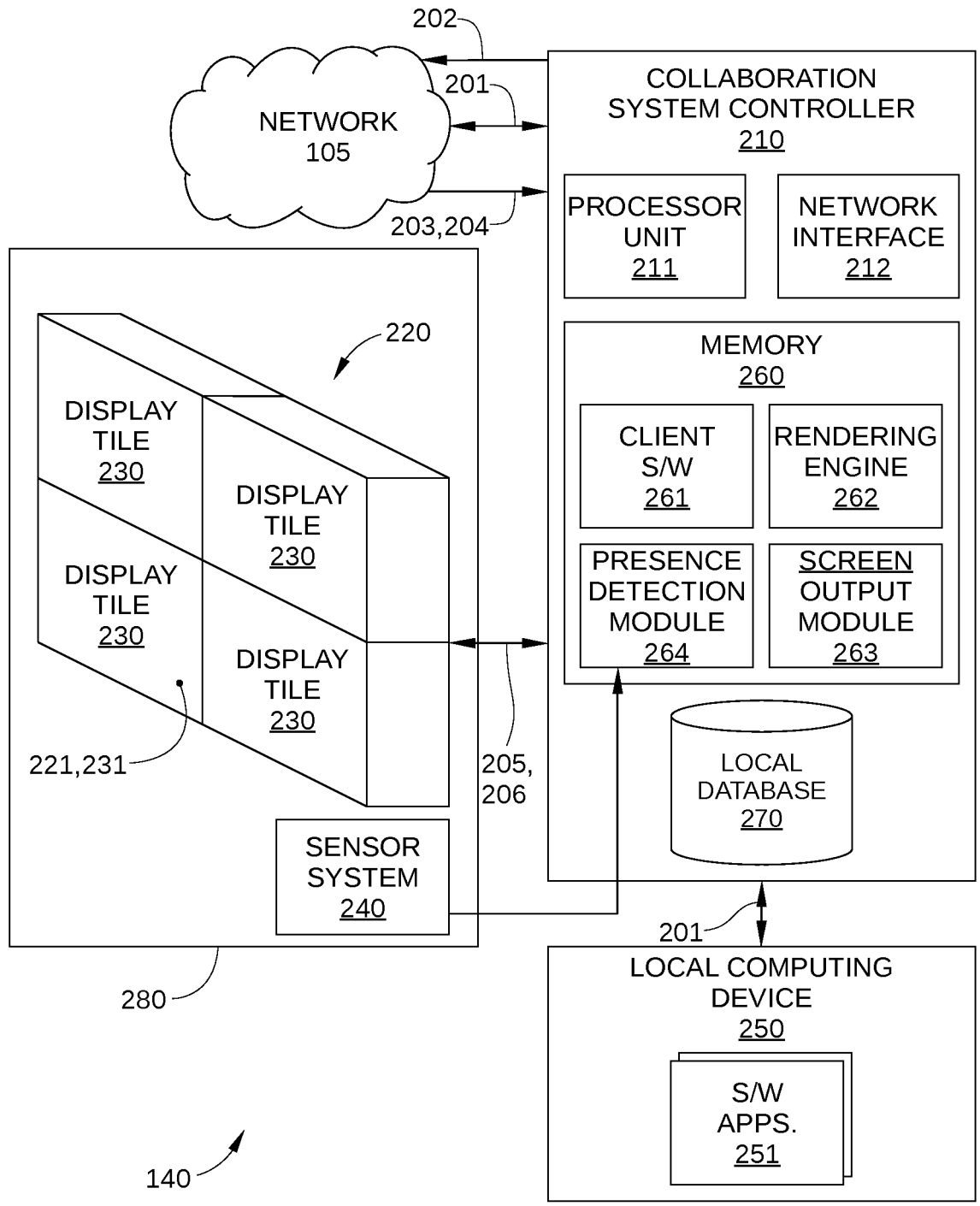
FIG. 2 is a more detailed block diagram of one of the collaboration system clients of FIG. 1, according to various embodiments of the present invention.

FIG. 2 is a more detailed block diagram of a collaboration system client 140, according to various embodiments of the present invention. As shown, collaboration system client 140 includes, without limitation, a collaboration system controller 210 and an interactive display wall 220 disposed within a collaboration venue 280 that has a sensor system 240. In some embodiments, a local computing device 250 may be coupled to collaboration system controller 210 as well. In some embodiments, collaboration system client 140 may include a single screen, a computer display, electronic tablet, smart phone, or any other single-screen device.

Collaboration system controller 210 receives digital content 201 from local computing device 250 or from another remotely located collaboration system client 140 via collaboration server 120 and information network 105 (both shown in FIG. 1). Digital content 201 may include images, videos, documents, or other content associated with one or more assets. Collaboration system controller 210 then converts digital content 201 into image data signals 205 and transmits image data signals 205 to interactive display wall 220 for display. In addition, collaboration system controller 210 also transmits presence detection data 202 to collaboration server 120 and receives participant data 203 and asset metadata 204 from collaboration server 120.

Presence detection data 202 indicates that a particular user is in collaboration venue 280. In some embodiments, presence detection data 202 also indicates the total number of users currently in collaboration venue 280 and/or identification information for each user currently in collaboration venue 280. When sensor system 240 detects that a new user enters collaboration venue 280, collaboration system controller 210 communicates the presence of the new user to collaboration server 120 via presence detection data 202, and user/location metadata 129 is updated accordingly. Furthermore, presence detection data 202 may include location information for each user in collaboration venue 280.

Participant data 203 indicates particular users that are located at one or more remote collaboration system clients 140. In some embodiments, participant data 203 may include unique identifiers for each such user, such as a name, employee number, and the like. Furthermore, in some embodiments, participant data 203 may also include authorization information associated with each such user, such as the authorization level of each user.

Asset metadata 204 includes a status associated with an asset currently displayed in collaboration venue 280 on interactive display wall 220. In some embodiments, asset metadata 204 may include a status for each asset so displayed. In some embodiments, the status for each asset indicates whether the asset should currently be displayed normally by interactive display wall 220 or obscured in some way or prevented from being presented. For example, when one or more users in collaboration venue 280 are present who are not authorized to view and/or hear a particular asset that is included in the currently displayed workspace, such a status would indicate that the asset should be obscured or no longer displayed or played. By contrast, when all users present in collaboration venue 280 are authorized to view and/or hear the particular asset, such a status would indicate that the asset should be displayed or played normally. In other embodiments, the status for each asset may indicate an authorization level associated with a particular asset, so that collaboration system controller 210 can determine locally what assets are displayed normally and what assets are obscured in some fashion or prevented from being presented.

Collaboration system controller 210 includes a processor unit 211, a memory 212, a network interface 212, and in some embodiments a local database 270. Processor unit 211 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processor unit 211 may be any technically feasible hardware unit capable of processing data and/or executing software applications to facilitate operation of collaboration system client 140, including client software 261, a rendering engine 262, a screen output module 263, and a presence detection module 264.

During operation, client software 261, rendering engine 262, screen output module 263, and presence detection module 264 may reside in memory 212. Client software 261, rendering engine 262, and screen output module 263, are described below in conjunction with FIG. 5, and presence detection module 264 is described below in conjunction with FIGS. 4 and 5. In some embodiments, one or more of client software 261, rendering engine 262, screen output module 263, and presence detection module 264 may be implemented in firmware, either in collaboration system controller 210 and/or in other components of collaboration system client 140.

Memory 212 may include volatile memory, such as a random access memory (RAM) module, and non-volatile memory, such as a flash memory unit, a read-only memory (ROM), or a magnetic or optical disk drive, or any other type of memory unit or combination thereof. Memory 212 is configured to store any software programs, operating system, drivers, and the like, that facilitate operation of collaboration system client 140, including client software 261, rendering engine 262, screen output module 263, and presence detection module 264.

Interactive display wall 220 may include the display surface or surfaces of any technically feasible display device or system type, including but not limited to the display surface of a light-emitting diode (LED) display, a digital light (DLP) or other projection display, a liquid crystal display (LCD), an optical light-emitting diode display (OLED), a laser-phosphor display (LPD), and/or a stereo 3D display, all arranged as a single stand-alone display, head-mounted display, or as a single or multi-screen tiled array of displays. Display sizes may range from smaller handheld or head-mounted display devices to full wall displays. In the example illustrated in FIG. 2, interactive display wall 220 includes a plurality of display tiles 230 mounted in a 2×2 array. Other configurations and array dimensions of multiple electronic display devices, e.g. 1×4, 2×3, 5×6, etc., also fall within the scope of the present invention. One embodiment of a display tile 230 is illustrated in FIG. 3.

Figure 3:
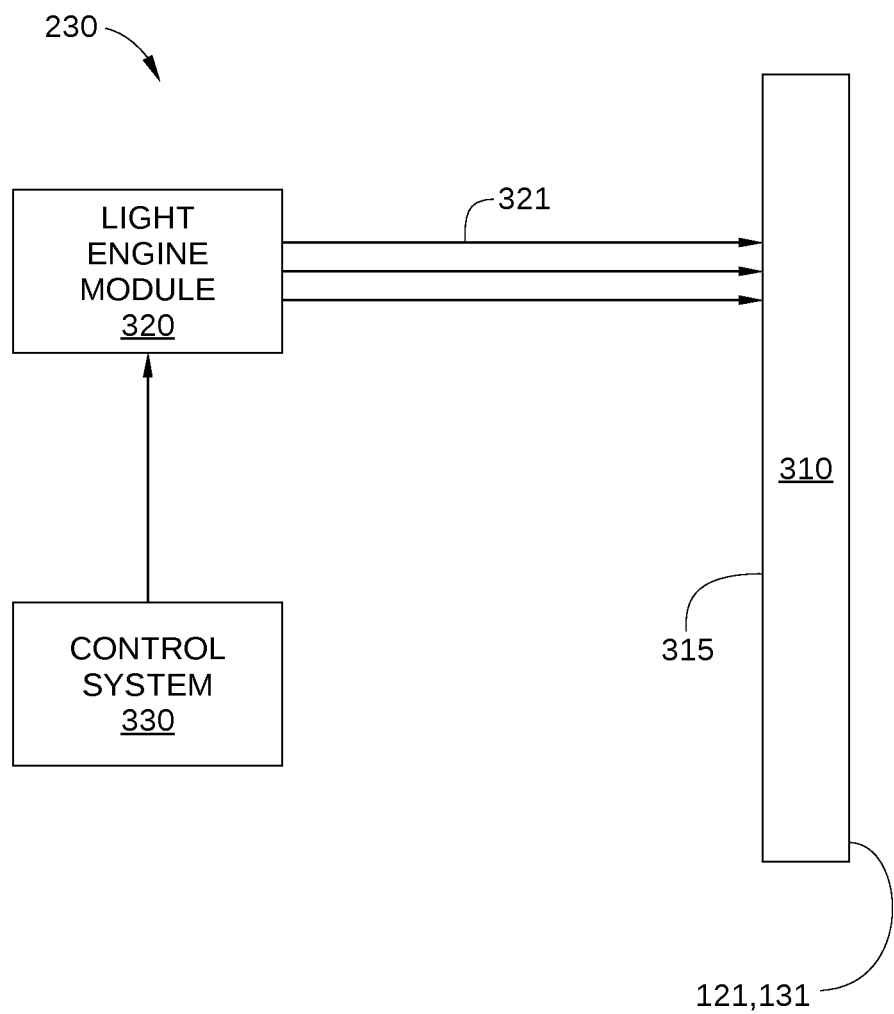
FIG. 3 is a schematic diagram of a display tile associated with the collaboration system client of FIG. 2, according to various embodiments of the present invention.

FIG. 3 is a schematic diagram of a display tile 230, according to various embodiments of the present invention. FIG. 3 is an example configuration only, and any other technically feasible display device suitable for forming display wall 220 may be implemented in alternative embodiments. As shown, display tile 230 includes, without limitation, a display screen region 310, a light engine module 320, and a control system 330. The display screen region 310 is configured to display digital images that are visible to a viewer.

Light engine module 320 is configured to emit one or more scanning beams (e.g., laser beams 321) onto a scan surface 315 of display screen region 310. Display screen region 310 may include a phosphor layer (not shown) that phosphoresces when excited by the optical energy conducted by the one or more laser beams 321, thereby creating visible light. The light engine module 320 is configured to emit one or more laser beams 322 that sweep across the phosphor layer of the display screen region 310 in a pulse width and pulse amplitude modulation manner in order to create visible light that represents an image. The visible light associated with the image emanates through an image surface of the display screen region 310 to a viewer.

The control system 330 is configured to transmit command data to the light engine module 320 to cause light engine module 320 to emit laser beams 321 onto scan surface 315. Control system 330 controls and modulates laser beams 321 emitted by the light engine module 320 so that laser beams 321 are modulated to carry the image to be displayed on scan surface 315. The control system can include a digital image processor that generates digital image signals for three different color channels and laser driver circuits that produce laser control signals carrying the digital image signals. The laser control signals are then applied to modulate the lasers, e.g., the currents for laser diodes.

More detailed descriptions of display devices suitable for being configured as a display tile 330 in a collaboration system clients 140 may be found in US Patent Publication 2014/0307230, published Oct. 16, 2014 and entitled "SELF ALIGNING IMAGER ARRAY" and US Patent Publication 2014/0362300, published Dec. 11, 2014 and entitled "Servo Feedback Control Based on Invisible Scanning Servo Beam in Scanning Beam Display Systems with Light-Emitting Screens."

Returning to FIG. 2, local computing device 250 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. In some embodiments, software applications 251 may reside in computing device 250. Examples of software applications 251 may include slide show presentation software, word processor software, collaboration design software, image editing software, video player software, and remote conferencing applications.

In embodiments in which collaboration system client 140 is configured as a stand-alone system, and is not coupled to network 105, collaboration system client 140 may include local database 270. Local database 270 generally stores metadata normally provided by collaboration server 120, such as metadata for specific assets, workspaces, and/or projects.

Interactive display wall 220 includes one or more display tiles 230, a display surface 221, and a gesture-sensitive surface 231. Display surface 221 extends across display surface 221, and typically includes the combined display surfaces of display tiles 230. Likewise, gesture-sensitive surface 231 extends across display surface 221. Consequently, gesture-sensitive surface 231 and display surface 221 are generally referred to as a single construct, i.e., a gesture-sensitive display surface.

Taken together, gesture-sensitive surface 231 and display surface 221 enable users to interact with assets displayed on the wall using touch or proximity gestures including tapping, dragging, swiping, and pinching, in addition to conventional cursor inputs. These touch gestures may replace or supplement the use of typical peripheral I/O devices such as an external keyboard or mouse. Gesture-sensitive surface 231 may be a "multi-touch" surface, which can recognize more than one point of contact on interactive display wall 220, enabling the recognition of complex gestures, such as two or three-finger swipes, pinch gestures, and rotation gestures, as well as multiuser gestures. Thus, one or more users may interact with assets on interactive display wall 220 using touch gestures such as dragging to reposition assets on the screen, tapping assets to display menu options, swiping to page through assets, or using pinch gestures to resize assets. Multiple users may also interact with assets on the screen simultaneously. In some embodiments, gesture-sensitive surface 231 may include an array of infra-red beams that, when interrupted, indicate user hand or finger position. Thus, in such embodiments, gesture-sensitive surface 231 is not strictly a touch-screen, but effectively operates as one.

In operation, interactive display wall 220 displays image data signal 205 that are output from controller 210. For a tiled display, as illustrated in FIG. 2, image data signals 205 are appropriately distributed among display tiles 230 such that a coherent image is displayed on a display surface 221 of interactive display wall 220. Gesture signals 206 generated by gesture-sensitive surface 231 are sent from interactive display wall 220 to collaboration system controller 210 for processing and interpretation.

Sensor system 240 includes one or more cameras, sensors, or other devices configured to determine the presence of users in collaboration venue 280. In some embodiments, sensor system 240 may be configured to identify each user present in collaboration venue 280, and/or the total number of users currently present in collaboration venue 280. In some embodiments, sensor system 240 may also be configured to determine proximity of users to interactive display wall 220. Each sensor system 240 may be associated with a corresponding collaboration system client 140. The data derived from the sensor system 240 may be stored in the collaboration system client 140, which may further provide the data in the form of metadata to the collaboration system server 120, such as presence detection data 202. The collaboration system server 120 then stores the sensor system 240 metadata from each sensor system of each collaboration system client within a collaboration or collaboration workspace. One embodiment of collaboration venue 280 and sensor system 240 is illustrated in FIG. 4.

Figure 4:
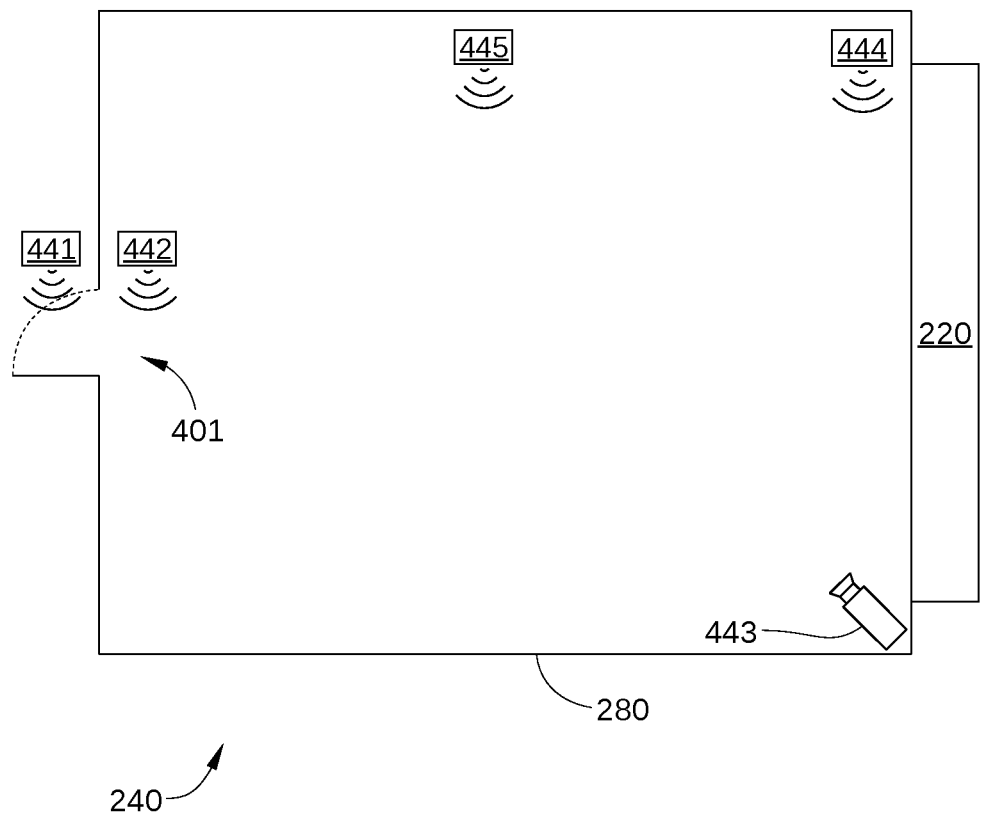
FIG. 4 schematically illustrates a collaboration venue and a sensor system, according to according to various embodiments of the present invention.

FIG. 4 schematically illustrates collaboration venue 280 and sensor system 240, according to according to various embodiments of the present invention. Collaboration venue 280 may be any suitably configured meeting or presentation venue where a display for collaboration is present, such as a conference room, auditorium, office, open area, and the like. In some embodiments, collaboration venue 280 has limited access, for example via one or more entrances 401. Collaboration venue 280 includes interactive display wall 220, and sensor system 240 may include any combination of entry/exit sensors 441 and 442, a camera 443, a display proximity sensor 444, and a wireless local area network (WLAN) 445. In the embodiment illustrated in FIG. 4, collaboration venue 280 is depicted as a closed room with a single entrance 401. In other embodiments, collaboration venue 280 may be an open area proximate interactive display wall 220.

Entry/exit sensors 441 and 442 are generally positioned proximate each entrance 401 or a perimeter of an open area proximate interactive display wall 220, and facilitate determination of user entry to and exit from collaboration venue 280. For example, in some embodiments, entry/exit sensors 441 and 442 may include a radio-frequency identification (RFID) sensor for reading or sensing identification badges or other RFID devices that are each uniquely associated with a particular user. In such embodiments, detection of a particular RFID device by entry/exit sensor 441 followed by detection of the particular RFID device by entry/exit sensor 442 generally indicates that the user associated with the particular RFID device has entered collaboration venue 280. Conversely, detection of a particular RFID device by entry/exit sensor 442 followed by detection of the particular RFID device by entry/exit sensor 441 generally indicates that the user associated with the particular RFID device has exited a specific collaboration venue 280. In each case, sensor system 240 transmits an appropriate signal to presence detection module 264, so that collaboration system controller 210 can notify collaboration server 120 accordingly via presence detection data 202.

Alternatively or additionally, entry/exit sensor 441 and/or entry/exit sensor 442 may include a personal identification number (PIN) entry pad, magnetic stripe reader, biometric security device, or any other identification apparatus configured to identify each user upon or during entry to collaboration venue 280. Such apparatus may be employed in sensor system 240 as a second authentication factor for enhanced security of collaboration venue 280 and/or as a technique for positively identifying a user beyond mere possession of an RFID device. Alternatively, sensor system 240 may include a single entry/exit sensor, e.g., either entry/exit sensor 441 or entry/exit sensor 442, rather than a sensor inside and a sensor outside entrance 401.

Camera 443 may be any technically feasible digital image capture device suitable for use in body detection, face detection, face recognition, human figure detection, and the like. Thus, camera 443 may include video and/or still shot capabilities. In some embodiments, camera 443 is employed in sensor system 240 to identify, count, or visually confirm that the current number of users (e.g., bodies or faces) in collaboration venue 280 equals the number of users as determined based on entry/exit sensors 441 and 442 and/or other camera/sensor systems in the collaboration venue. For example, presence detection module 264 may include face and/or human figure detection algorithms that can process images generated by camera 443 to determine the current number of faces and/or human figures currently present in collaboration venue 280. In some embodiments, camera 443 is employed in sensor system 240 to facilitate facial recognition, for confirming that the current identities of users in collaboration venue 280 match the identities of users that were determined via entry/exit sensors 441 and 442 and provide as input, such as presence detection data 202, to be managed by collaboration server 120.

Alternatively or additionally, in some embodiments, camera 443 or one or more RFID sensors may be employed in sensor system 240 for detection of one or more users that are proximate interactive display wall 220, or other positions within collaboration venue 280. In such embodiments, collaboration system controller 210 may include data in presence detection data 202 indicating that one or more users are currently disposed at a particular location in collaboration venue 280, e.g., proximate interactive display wall 220. Thus, in remote collaboration venues 140 of collaboration environment 100 (not shown in FIG. 4), the location of one or more users can be indicated. Thus, users in remote collaboration venues 140 are aware of who is proximate interactive display wall 220 and currently editing assets or otherwise interacting with the currently displayed workspace, and who is located away from interactive display wall 220. In some embodiments, presence detection data 202 may indicate to what portion of interactive display wall 220 each of the one or more users are proximate.

Display proximity sensor 444 may be any technically feasible sensor capable of detecting, without user intervention, one or more users proximate interactive display wall 220 or identifying exactly which user or users are proximate to interactive display wall 220. In some embodiments, display proximity sensor 444 may also be capable of detecting, without user intervention, to which portion of interactive display wall 220 one or more users are proximate. Display proximity sensor 444 may include a simple motion-detection apparatus, such as an infrared-based motion detector, so that collaboration system controller 210 may include data in presence detection data 202 indicating that one or more users are proximate to interactive display screen 220. Alternatively or additionally, display proximity sensor 444 may include an apparatus configured to detect and/or read identification information associated with a user who is proximate interactive display wall 220. In some embodiments, display proximity sensor 444 may be a user personal device, such as a personal cell phone, which may transmit via one or more mechanisms (e.g. bluetooth or cell detection technology), and may provide user presence information or user identity information as presence detection data 202. In such embodiments, collaboration system controller 210 may include data in presence detection data 202 indicating which specific user or users are proximate interactive display screen 220. In some embodiments, presence detection data 202 may indicate to what portion of interactive display wall 220 each of the one or more users is proximate. In some embodiments, the proximity information for a user stored within the collaboration server may be compared within the collaboration server with detected interactive display wall captured information. This interactive display wall captured information may include user handwriting recognition, expected content activity interaction or other activity that correlates an interactive display wall activity with a user.

WLAN 445 may be any technically feasible wireless network configured to communicate with wireless devices present in collaboration venue 280, such as user mobile devices, wearable devices, electronic tablets, and the like. For example, WLAN 445 may include any suitable wireless personal area network (WPAN), such as a WiFi, Bluetooth, Z-Wave, ZigBee, or Insteon network, or any other suitable wireless network. Sensor system 240 may employ communications between individual users in collaboration venue 280 and WLAN 445 to determine the identity of users currently present therein. Thus, in some embodiments, based on identification information determined via WLAN 445, presence detection data 202 may indicate user identification information.

It will be appreciated that collaboration system client 140 described herein is illustrative and that variations and modifications are possible. For example, client software 261, rendering engine 262, and/or screen output module 263 may reside outside of collaboration system controller 210. In another example, collaboration system client 140 may be configured as a stand-alone system, in which the functionality of collaboration server 120 of FIG. 1 may be implemented locally in collaboration system client 140. It will be appreciated, that collaboration server 120 may have been pre-configured for each collaboration and/or collaboration venue with a collaboration registered user count and/or a user identification information for each collaboration venue, or for each collaboration session, or for the entire collaboration. This information may include metadata of the one or more users to include RFID signatures, face signatures, collaboration venue location information or other information that, when in operation the sensors system may enable the collaboration server to associate a detected user with the registered user.

It will be further appreciated, that the venues for a particular collaboration may be in different locations, different rooms utilizing one or more collaboration interactive displays per venue location, where the collaboration interactive display walls may be of one or more sizes that accommodates one or more users of the collaboration interactive display walls simultaneously. It will be further appreciated, that the sensor system setup for each venue location will allow for approximate location of one or more users with respect to position the one or more display walls and the position of what part of the display wall. In one embodiment, if two users are at one display device in collaboration venue 280, sensor system 240 will determine if the first user is positioned near one side of the display device and the other user is positioned near the other side of the display device.

User Authorization for Collaboration Venue

Figure 5:
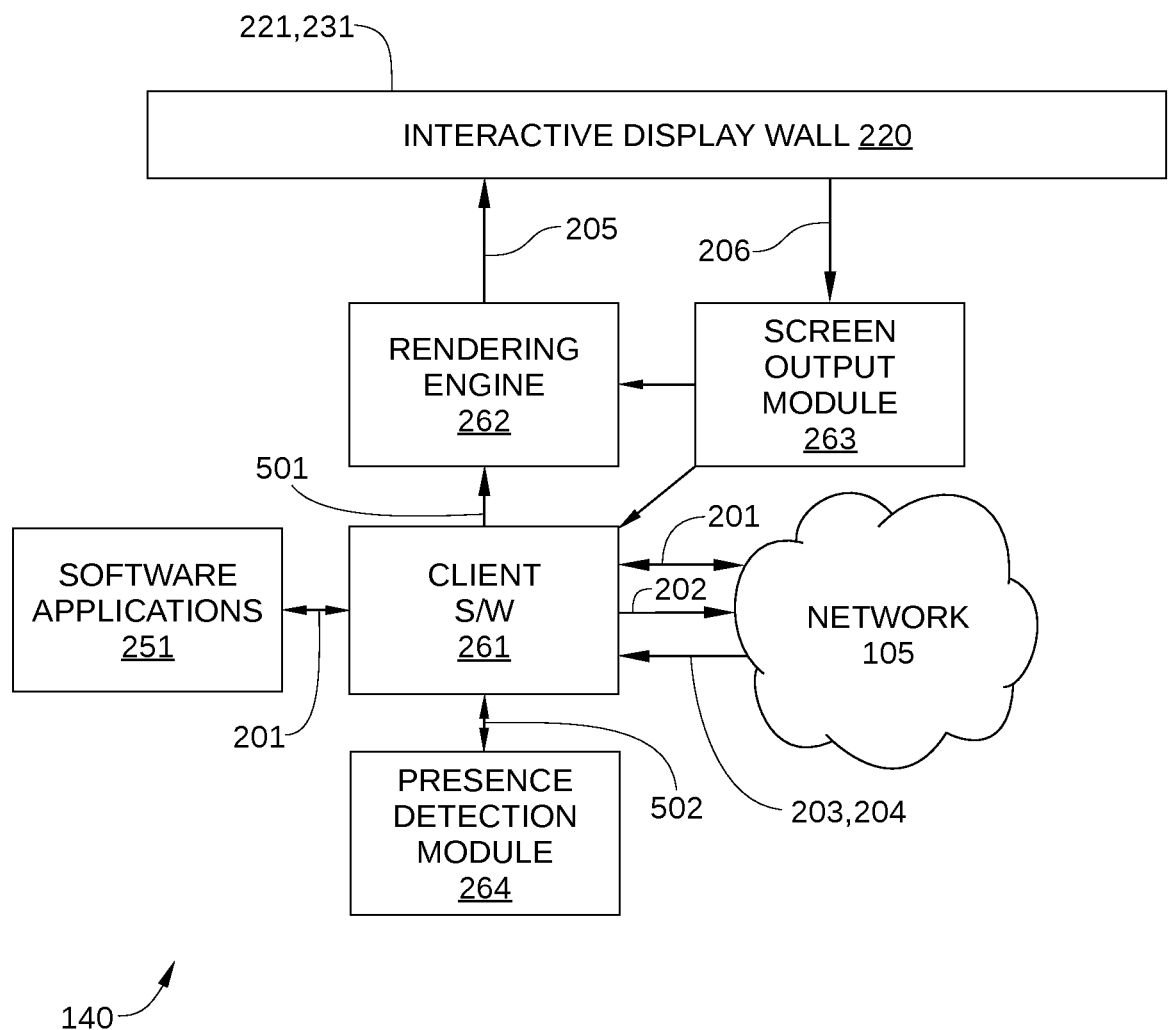
FIG. 5 is a block diagram illustrating the operation of collaboration system client of FIG. 1, according to various embodiments of the present invention.

FIG. 5 is a block diagram illustrating the operation of collaboration system client 140, according to various embodiments of the present invention. As shown, FIG. 5 illustrates interactions between client software 261, rendering engine 262, screen output module 263, presence detection module 264, software applications 251, and interactive display wall 220.

Rendering engine 262 receives render content 501 and sends image data signals 205 to interactive display wall 220. Typically, rendering engine 262 is responsible for determining the output for each pixel of interactive display wall 220. Screen output module 263 is responsible for receiving and interpreting gesture signals 203 from gesture-sensitive surface 231 of interactive display wall 220. When a user touches an asset or interacts with an asset using a gesture on interactive display wall 220, screen output module 263 sends information associated with this gesture-based input event to rendering engine 262 and/or to client software 261.

Client software 261 pulls digital content 201 from collaboration server 120 (shown in FIG. 1) via network 105, and generates workspaces based on this digital content 201. As described above, a workspace is the digital canvas on which assets are arranged and interacted with, and can be displayed on interactive display wall 220. Client software 261 may also receive digital content 201 from software applications 251, which reside on local computing device 250, and generate assets to be displayed on interactive display wall 220. Client software 261 also transmits digital content 201 to collaboration server 120, such as metadata associated with modifications made to an asset on interactive display wall 220. In addition, client software 261 sends render content 501 to rendering engine 262, where render content 501 is based on the digital content 201 that is to be displayed on interactive display wall 220.

Furthermore, in some embodiments, client software 261 may transmit presence detection data 202 to collaboration server 120 and receive participant data 203 and asset metadata 204 from collaboration server 120. In such embodiments, render content 501 generated by client software 261 may be modified based on participant data 203 and asset metadata 204 received via network 105 and on local presence detection data 502 generated by presence detection module 264. An embodiment in which render content 501 is modified by client software 261 based on participant data 203, asset metadata 204, and/or local present detection data 502 is described below in conjunction with FIGS. 6A, 6B, and 7.

FIG. 6A schematically illustrates a first collaboration venue 681 associated with a first collaboration system client 140 of collaboration environment 100, according to various embodiments of the present invention, and FIG. 6B schematically illustrates a second collaboration venue 682 associated with a second collaboration system client 140 of collaboration environment 100, according to various embodiments of the present invention. Users located within first collaboration venue 681 and second collaboration venue 682 are collaboratively working on a workspace that is currently displayed by interactive display walls 220A and 220B.

First collaboration venue 681 is depicted with a user 601 located within first collaboration venue 681 and proximate interactive display wall 220A, a user 602 located somewhere within first collaboration venue 681, and a user 603 that is just entering first collaboration venue 681. As shown, each of users 601, 602, and 603 has an authorization level of "A," indicating that each may view and edit all assets currently displayed by interactive display wall 220A. Second collaboration venue 682 is depicted with a user 611 located within second collaboration venue 682 and proximate interactive display wall 220B, a user 612 located somewhere within second collaboration venue 682, and a user 613 that is just entering second collaboration venue 682. As shown, user 611 has an authorization level of "A," indicating that user 611 may view and edit all assets currently displayed by interactive display wall 220B; user 612 has an authorization level of "B," indicating that user 612 may view but not edit any assets currently displayed by interactive display wall 220B; and user 613 has an authorization level of "C," indicating that user 613 may not view or edit one particular asset that is currently displayed by interactive display wall 220B.

FIG. 7 illustrates a participant map 700 that may be displayed as an asset within a collaboration workspace, according to various embodiments of the present invention. As shown, participant map 700 includes a diagram 721 of first collaboration venue 681 and a diagram 722 of second collaboration venue 682. Diagram 721 includes icons 701, 702, and 703 representing users 601, 602, and 603, respectively, while diagram 722 includes icons 711, 712, and 713 representing users 611, 612, and 613, respectively. User 601 has been detected proximate interactive display wall 220A, and icon 701 is accordingly disposed proximate the portion of diagram 721 that represents interactive display wall 220A. By contrast, users 602 and 603 have been detected as entering first collaboration venue 681, but have not been detected proximate interactive display wall 220A. Consequently, icons 702 and 703 are accordingly disposed in a center portion of diagram 721. For similar reasons, icons 711 is disposed proximate the portion of diagram 722 that represents interactive display wall 220B and icons 712 and 713 are disposed in a center portion of diagram 722.

Because participant map 700 can be displayed as an asset in first collaboration venue 681 and in second collaboration venue 682, all participants in both collaboration venues can clearly see how many participants are located at the remote collaboration venue. In addition, in embodiments in which users 601-603 and 611-613 can be identified by the sensor system 240 of the local collaboration venue, all participants in both collaboration venues may be provided additional information related to each user in the remote collaboration venue. For example, in the embodiment illustrated in FIG. 7, an authorization level for each participant (e.g., "A," "B," and "C") is indicated in participant map 700. Thus, users in collaboration venue 721 can be informed in real time that user 613, who has a lower authorization level, has just entered collaboration venue 722. Similarly, other identifying information may be displayed in or adjacent to each of icons 701-703 and 711-713, such as a user name, an employee number, a profile picture, and the like.

In some embodiments, an asset associated with a particular workspace is displayed normally in one collaboration venue, but in another collaboration venue is displayed blurred or otherwise obscured or not displayed at all. One such embodiment is illustrated in FIGS. 8A and 8B.

Figure 8A:
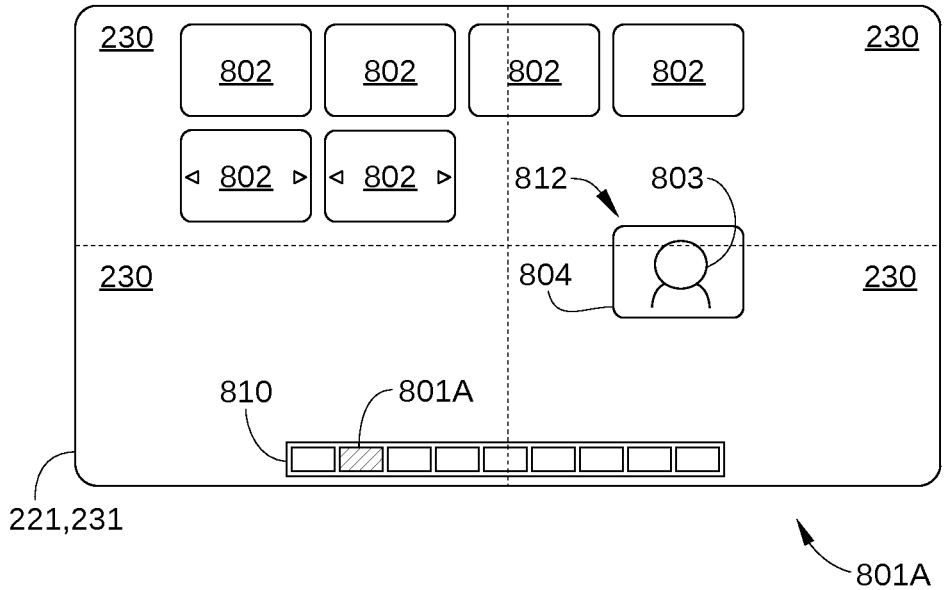
FIG. 8A illustrates a collaboration workspace displayed by an interactive display wall associated with a collaboration venue that is participating in a collaboration, according to various embodiments of the present invention.
Figure 8B:
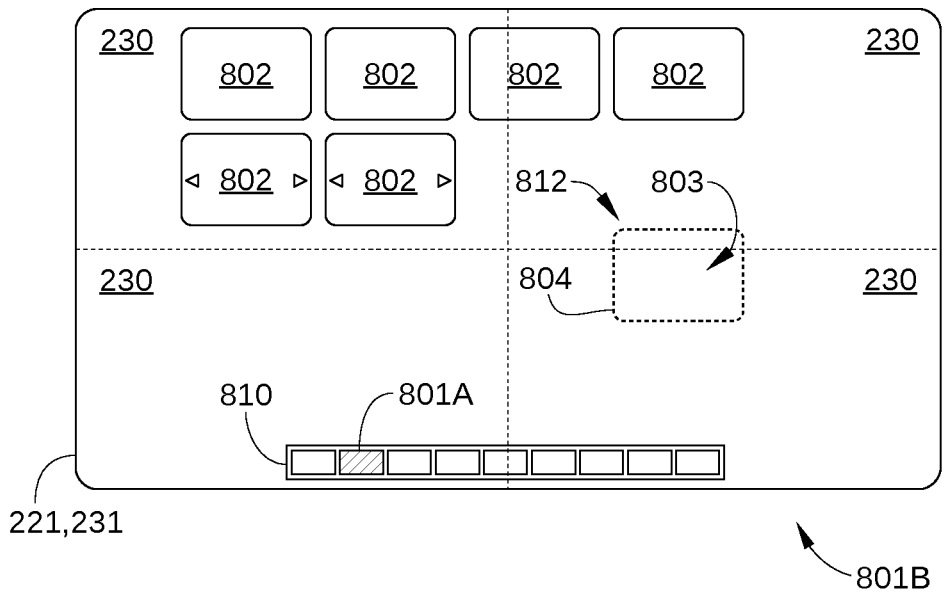
FIG. 8B illustrates the collaboration workspace of FIG. 8A displayed by an interactive display wall associated with a different collaboration venue that is participating in the collaboration, according to various embodiments of the present invention.

FIG. 8A illustrates a collaboration workspace 801A displayed by interactive display wall 220A in first collaboration venue 681, and FIG. 8B illustrates a workspace 801B displayed by interactive display wall 220B in second collaboration venue 682, according to various embodiments of the present invention. Workspace 801 includes multiple assets 802 and a workspace menu 810. As shown, each asset 802 may be positioned at a particular location on display surface 221, and may be displayed across one or multiple display tiles 230. Each asset 802 includes asset content 803 that is displayed within a presentation window 804. Workspace menu 810 includes icons representing some or all of the workspaces associated with a particular project. For example, in the embodiment illustrated in FIGS. 8A and 8B, workspace 801 is indicated in workspace menu 810 by an icon 801A (cross-hatched).

Users 601-603 in FIG. 6A and users 611-613 in FIG. 6B are collaborating on the same project, consequently substantially the same workspace is displayed by interactive display walls 220A and 220B. That is, workspace 801A and workspace 801B each include the same assets 802. However, depending on the authorization of the users located in a particular collaboration venue, the assets actually displayed in that particular collaboration venue may be different than the assets actually displayed in other collaboration venues.

In the embodiment illustrated in FIGS. 8A and 8B, asset 812 includes private content that not all users are authorized to view and/or hear. Specifically, user 613 in FIG. 6B is not authorized to see or hear the private content included in asset 812. Consequently, in the embodiment illustrated in FIG. 8A, asset 812 and asset content 803 are displayed in workspace 801A, while in FIG. 8B, asset 812 and asset content 803 are obscured in workspace 801B. For example, in some embodiments, asset 812 and/or asset content 803 are blurred or otherwise rendered unviewable, such as not being displayed at all. In other embodiments, asset 812 and/or asset content 803 are simply not displayed. In such embodiments, presentation window 804 of asset 812 may still be displayed normally or at reduced brightness to indicate the location of 812 and thereby serve as a placeholder of sorts in workspace 801B. However, when user 613 in FIG. 6B exits collaboration venue 682, asset 812 and asset 803 are again displayed normally in workspace 801B.

Figure 9:
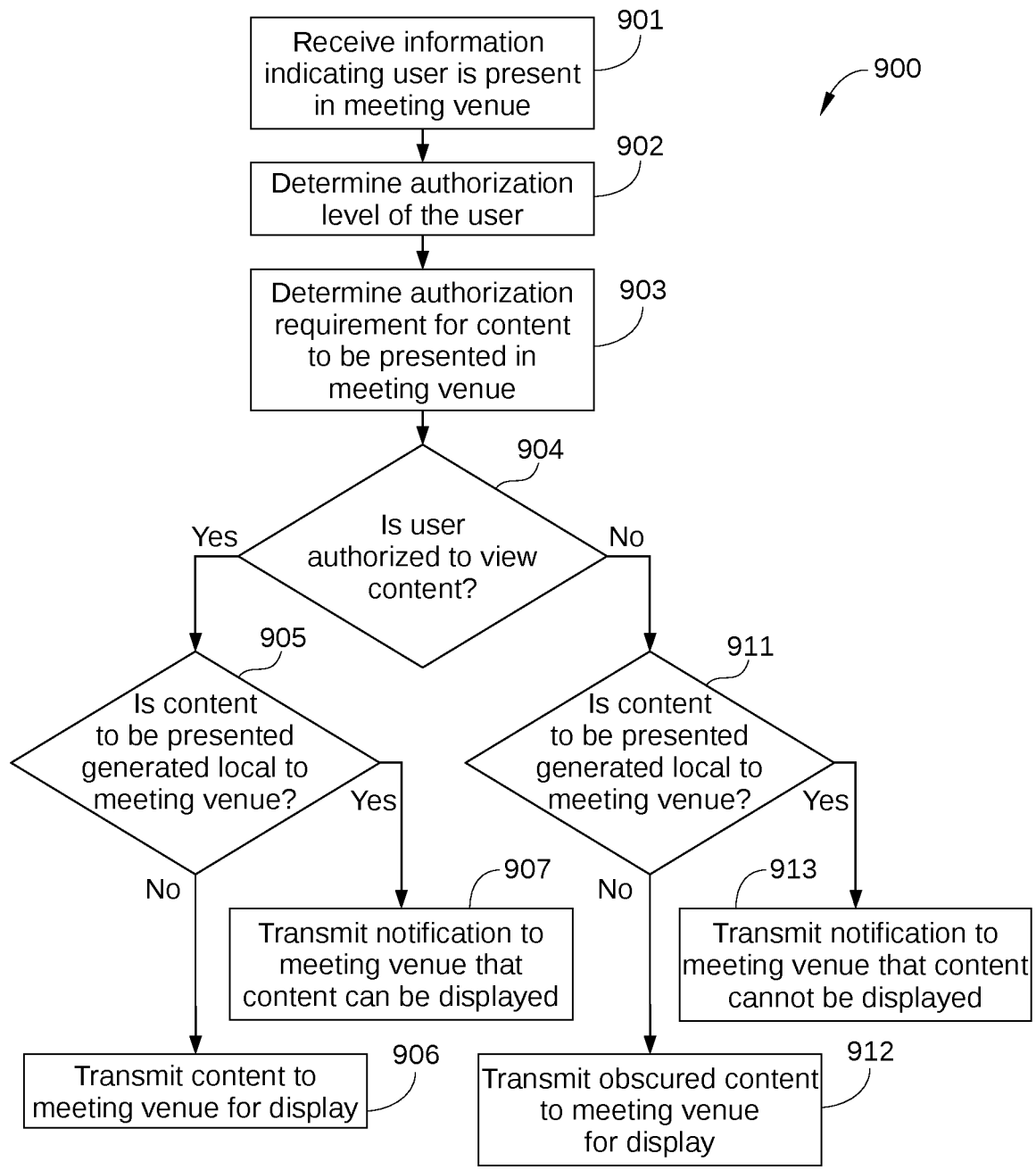
FIG. 9 is a flowchart of method steps for displaying information at different collaboration venues during a collaboration, according to various embodiments of the present invention.
Figure 10:
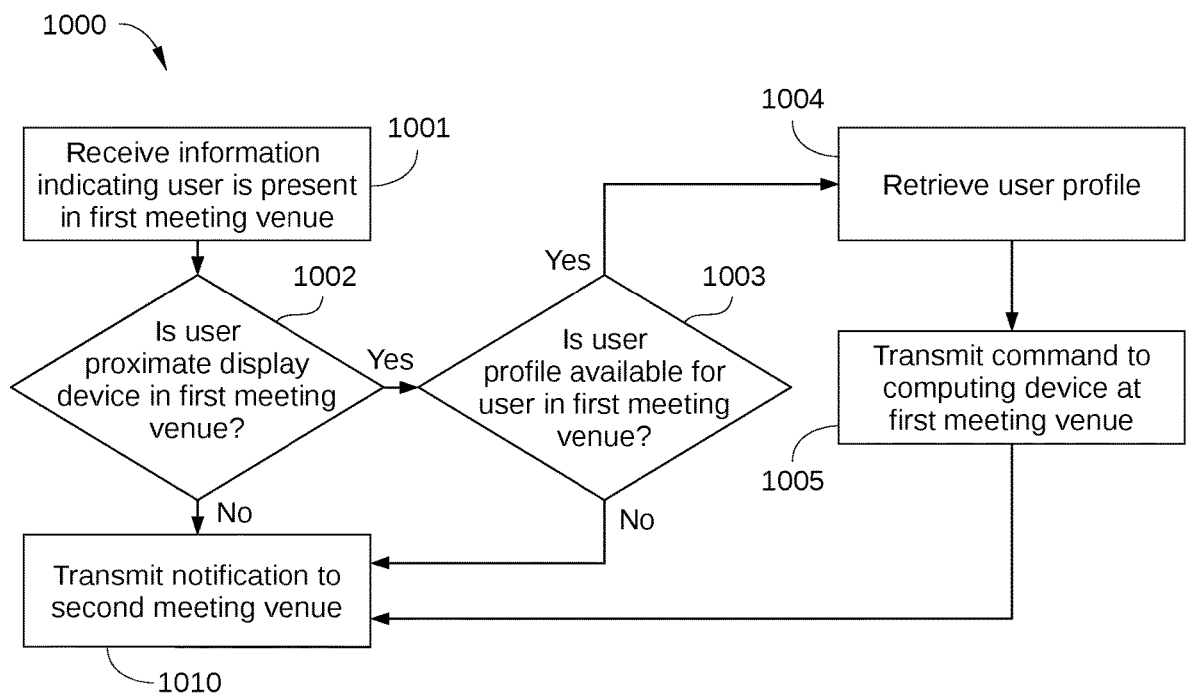
FIG. 10 is a flowchart of method steps for managing a collaboration environment, according to various embodiments of the present invention.

Embodiments of the invention enable comprehensive management of a collaboration environment, such as collaboration environment 100, so that certain actions are taken based on the identifies of participants in each of the different locations in the collaboration environment. FIGS. 9 and 10 set forth embodiments in which such actions are executed in the collaboration environment.

FIG. 9 is a flowchart of method steps for displaying information at different collaboration venues during a collaboration, according to various embodiments of the present invention. Although the method steps are described in conjunction with the systems of FIGS. 1-8B, persons skilled in the art will understand that any system configured to perform the method steps, in any order, is within the scope of the present invention.

As shown, a method 900 begins at step 901, where authorization module 127 receives information indicating that a user is present in a collaboration venue, such as a collaboration venue of a collaboration system client 140. For example, authorization module 127 may receive presence detection data 202 from the collaboration system controller 210 of the collaboration system client 140 when a user enters the collaboration venue by passing near one or more entry/exit sensors 441 and 442, or enters a PIN at an entrance to the collaboration venue. In some embodiments, presence detection data 202 includes information indicating that a user or users have recently been detected in the collaboration venue. In other embodiments, presence detection data 202 includes information indicating all users currently determined to be in the collaboration venue. In some embodiments, authorization module 127 receives presence detection data 202 via RESTful API 123.

In step 902, authorization module 127 determines an authorization level of the user that is present in the collaboration venue. For example, in some embodiments, the authorization level of the user may be stored in authorization metadata 125. As noted previously, any technically feasible criteria may be employed to indicate authorization level of a user, including a security clearance level, employment status, current location, and the like.

In step 903, authorization module 127 determines an authorization requirement for content to be presented in the collaboration venue. For example, in some embodiments, for each asset to be displayed in the collaboration venue, authorization module 125 performs a lookup operation in authorization metadata 125. Thus, each asset may have a different authorization requirement associated therewith. In some embodiments, some or all of the content may be generated local to the collaboration venue, i.e., by the collaboration system client 140 associated with the collaboration venue. In other embodiments, some or all of the content may be generated in remote collaboration venues associated with other collaboration system clients 140 of collaboration environment 100.

In step 904, authorization module 127 determines whether the user or users are authorized to view the content to be displayed in the collaboration venue in which the user is present. In some embodiments, authorization module 127 determines such authorization for any newly detected user or users in the collaboration venue, and in other embodiments, authorization module 127 determines such authorization for all users currently present in collaboration venue. If yes, method 900 proceeds to step 905; if no, method 900 proceeds to step 911.

In step 905, authorization module 127 authorization module 127 determines whether the content to be presented is generated local to the collaboration venue in which the user is present. For example, the content may include a single asset or a plurality of assets. Generally, step 905 is performed for each asset to be displayed in the collaboration venue. If no, method 900 proceeds to step 906; if yes, method 900 proceeds to step 907.

In step 906, authorization module 127 transmits the content to the collaboration venue for display, for example via real-time API 124. Thus, when authorization module 127 determines that a newly detected user has an authorization level that satisfies the authorization requirement of a particular asset, the asset is displayed in the collaboration venue normally. Alternatively, when authorization module 127 determines that all users currently present in the collaboration venue, including any a newly detected users, have an authorization level that satisfies the authorization requirement of a particular asset, the asset is displayed in the collaboration venue normally. Step 906 may be repeated for each asset to be displayed in the collaboration venue.

In step 907, which is performed when an asset is determined to be generated local to the collaboration venue, authorization module 127 transmits a notification to the collaboration venue, or to the collaboration system client 140 associated with the collaboration venue, that the asset can be displayed in the collaboration venue. For example, in some embodiments, authorization module 127 transmits, via real-time API 124, participant data 203.

In step 911, which is performed when a user is determined to be unauthorized to view and/or hear a particular asset, authorization module 127 determines whether the content to be presented is generated local to the collaboration venue in which the user is present. For example, the content may include a single asset or a plurality of assets. Generally, step 911 is performed for each asset to be displayed in the collaboration venue. If no, method 900 proceeds to step 912 if yes, method 900 proceeds to step 913.

In step 912, authorization module 127 transmits obscured content to the collaboration venue for display, for example via real-time API 124. Thus, when authorization module 127 determines that a newly detected user does not have an authorization level that satisfies the authorization requirement of a particular asset, authorization module 127 causes the asset to be obscured or otherwise prevented from being presented. Alternatively, when authorization module 127 determines that any user currently present in the collaboration venue does not have an authorization level that satisfies the authorization requirement of the particular asset, authorization module 127 causes the asset not to be displayed or otherwise presented. In some embodiments, authorization module 127 causes the asset not to be displayed or otherwise presented by halting transmission of the asset to the collaboration venue in which the unauthorized user is present. In other embodiments, authorization module 127 causes the asset not to be displayed or otherwise presented by transmitting for display an obscured version of the private content, such as a blurred and/or muted version of the asset. Step 912 may be repeated for each asset to be displayed in the collaboration venue.

In step 913, which is performed when an asset is determined to be generated local to the collaboration venue, authorization module 127 transmits a notification to the collaboration venue or the collaboration system client 140 associated with the collaboration venue that the asset cannot be displayed normally in the collaboration venue. For example, in some embodiments, authorization module 127 transmits, via real-time API 124, asset metadata 204.

FIG. 10 is a flowchart of method steps for managing a collaboration environment, according to various embodiments of the present invention. Although the method steps are described in conjunction with the systems of FIGS. 1-9, persons skilled in the art will understand that any system configured to perform the method steps, in any order, is within the scope of the present invention.

As shown, a method 1000 begins at step 1001, where location module 128 receives sensor information, such as presence detection data 202, indicating that a first user is present in a first collaboration venue. Generally, the sensor information includes information identifying the first user, either as a generic user that has entered a particular collaboration venue 280, or as a specific user. In the latter case, the information identifying the first user may be an employee number, a PIN entered by the user, biometric entry data associated with the first user or metadata that corresponds to such biometric entry data, and the like. Generally the notification is received from a computing device associated with the first collaboration venue, such as collaboration system controller 210.

In some embodiments, the sensor information may further include a location of the first user within the collaboration venue and/or relative to a display device of the collaboration venue, such as interactive display wall 220. In some embodiments, the sensor information may indicate to what portion of the display device the first user is proximate, e.g., left portion, right portion, or center portion. Furthermore, in some embodiments, the sensor information may include a location or other location information for all users currently detected in the first collaboration venue. In some embodiments, location module 128 may also retrieve some location information and/or user identification information from user/location metadata 129.

In some embodiments, location module 128 also receives sensor information, such as presence detection data 202, indicating that a second user is present in a second collaboration venue. In such embodiments, the sensor information indicating that the second user is present in the second collaboration venue may be substantially similar to the above-described sensor information associated with the first user and the first collaboration venue.

In step 1002, location module 128 determines whether the first user is proximate a display device of the first collaboration venue, for example based on the notification received in step 1001. If yes, method 1000 proceeds to step 1003; if no, method 100 proceeds to step 1010. Step 1002 may be repeated for the second user in embodiments in which location module 128 receives sensor information indicating that the second user is present in the second collaboration venue.

In step 1003, location module 128 determines whether a user profile is available for the first user referenced in the information received in step 1001 indicating that the first user is present in the first collaboration venue. For example, such a profile may be included in user/location metadata 129. If yes, method 1000 proceeds to step 1004; if no, method 100 proceeds to step 1010. Step 1003 may be repeated for the second user in embodiments in which location module 128 receives sensor information indicating that the second user is present in the second collaboration venue.

In step 1004, location module 128 retrieves the user profile for the first user, and if applicable for the second user, for example from user/location metadata 129.

In step 1005, location module 128 transmits a command to a computing device associated with the first collaboration venue, based on the user profile retrieved in step 1004. In some embodiments, location module 128 transmits a command to collaboration system controller 210 to perform an input response associated with the user referenced in step 1001. For example, in some embodiments, an input response associated with the user may include generating responses to user input that are tailored for the user referenced in step 1001. Thus, when the user is detected to be proximate a display device in a particular collaboration venue, the display device can respond with previously configured input responses, such as edited menu options and/or other personalized display or interaction settings. In some embodiments, interaction settings may include personalized asset window settings, such as asset display size, location of the asset on a display device, and the like.

Additionally or alternatively, in some embodiments, location module 128 transmits a command to collaboration system controller 210 of the first collaboration venue to display content associated with the first user referenced in step 1001. For example, in some embodiments, such display content may include particular interaction menus, assets associated with the current collaboration, personal information or identifying image, a personalized user interface or window, and the like. Similarly, location module 128 may also transmit a command to collaboration system controller 210 of the second collaboration venue to display content associated with the second user referenced in step 1001.

In step 1010, location module 128 transmits a notification to a third collaboration venue. In some embodiments, the notification includes information identifying the first user and/or the second user referenced in step 1001. In addition, the notification sent to the third collaboration venue may include a location of the first user relative to a display device associated with the first collaboration venue and/or a location of the second user relative to a display device associated with the second collaboration venue. Furthermore, in some embodiments, the notification sent to the third collaboration venue may include a command to display a map of the first collaboration venue that includes the user referenced in step 1001 and/or all users currently detected in the first collaboration venue, and/or a map of the second collaboration venue that includes the user referenced in step 1001 and/or all users currently detected in the second collaboration venue. Thus, users located in the third collaboration venue can readily ascertain what users are located at the first and second collaboration venues, and which users are disposed proximate a display device of the first and second collaboration venues.

Further, in some embodiments, location module 128 transmits the above-described notification to all venues associated with the current common collaboration. Thus, users located at each collaboration venue can readily ascertain what users are located at the first collaboration venue and the second collaboration venue, and which users are disposed proximate a display device of the first collaboration venue and the second collaboration venue. In one or more embodiments, upon completion of method 1000, authorization module 127 may perform method 900, as described above. Alternatively, in one or more embodiments, location module 128 may perform method 1000 prior to authorization module 127 performing method 900, as described above.

In sum, embodiments of the present invention provide systems and methods for securely displaying information in one or more collaboration venues. In a multi-venue collaboration platform, individual assets are displayed or prevented from being displayed in a particular collaboration venue based on the presence of unauthorized users in that particular collaboration venue. A sensor system in the collaboration venue detects the presence of and identifies users in the collaboration venue, and communicates the detected users to a centrally located authorization module. Based on the authorization level of the detected users, the centrally located authorization module can then determine on a per-asset basis what content can be displayed at each collaboration venue.

At least one advantage of the techniques described herein is that collaborative work at remote locations can be performed on sensitive content with much less risk of exposure to unauthorized users. A further advantage is that users in one collaboration venue can readily determine what users are present in a remote collaboration venue.

1. In some embodiments, a computer-implemented method for managing a collaboration environment comprises: receiving sensor information from one or more sensors disposed at a first collaboration venue indicating that a first user is present within the first collaboration venue; receiving sensor information from one or more sensors disposed at a second collaboration venue indicating that a second user is present within the second collaboration venue; identifying the first user based on the sensor information received from the first collaboration venue; identifying the second user based on the sensor information received from the second collaboration venue; and executing one or more actions with respect to a third collaboration venue based on at least one of identification information of the first user and identification information of the second user.

2. The method of clause 1, wherein executing one or more actions comprises transmitting a notification to the third collaboration venue that indicates at least one of the identification information of the first user and the identification information of the second user.

3. The method of any of clauses 1-2, wherein the sensor information received from the first collaboration venue indicates a location of the first user relative to a display device present within the first collaboration venue, and the notification to the third collaboration venue indicates the location of the first user relative to the display device.

4. The method of any of clauses 1-3, wherein executing one or more actions comprises causing a display map to be displayed on a display device present within the third collaboration venue that includes a location of the first user within the first collaboration venue and a location of the second user within the second collaboration venue.

5. The method of any of clauses 1-4, wherein executing one or more actions comprises transmitting a command to a computing device associated with the first collaboration venue to generate responses to user input that are tailored for the first user.

6. The method of any of clauses 1-5, wherein executing one or more actions comprises transmitting a command to a computing device associated with the first collaboration venue to display content tailored to the first user.

7. The method of any of clauses 1-6, wherein the content tailored to the first user includes one or more of a preferred user interface associated with the first user, a particular window layout of assets associated with the first user, and a particular asset associated with the first user.

8. The method of any of clauses 1-7, wherein executing one or more actions comprises: determining an authorization level of the user; determining an authorization requirement for content that is to be displayed at the first collaboration venue; determining whether the authorization level of the first user satisfies the authorization requirement of the content that is to be displayed; and when the authorization level of the first user satisfies the authorization requirement of the content that is to be displayed, transmitting the content to the first collaboration venue for display, or when the authorization level of the first user does not satisfy the authorization requirement of the content that is to be displayed, causing the content not to be displayed at the first collaboration venue or to be obscured when displayed at the first collaboration venue.

9. The method of any of clauses 1-8, wherein causing the content not to be displayed comprises halting transmission of the content to the first collaboration venue or transmitting a command to a computing device associated with the first collaboration venue to halt display of the content, and wherein causing the content to be obscured when displayed comprises transmitting an obscured version of the content to a computing device associated with the first collaboration venue.

10. In some embodiments, a system for managing a collaboration environment comprises: a memory storing a user and/or location management algorithm; and one or more processors that are coupled to the memory and, when executing the user and/or location management algorithm, are configured to: receive sensor information from one or more sensors disposed at a first collaboration venue indicating that a first user is present within the first collaboration venue; receive sensor information from one or more sensors disposed at a second collaboration venue indicating that a second user is present within the second collaboration venue; identify the first user based on the sensor information received from the first collaboration venue; identify the second user based on the sensor information received from the second collaboration venue; and execute one or more actions with respect to a third collaboration venue based on at least one of identification information of the first user and identification information of the second user.

11. The system of any of clauses 1-10, wherein the one or more sensors disposed at the first collaboration venue are configured to communicate with a mobile device proximate the first collaboration venue or read a radio-frequency identification badge associated with the first user.

12. The system of any of clauses 1-11, wherein the one or more sensors disposed at the first collaboration venue include a biometric sensor.

13. The system of any of clauses 1-12, wherein the one or more sensors disposed at the first collaboration venue include a proximity sensor that determines when the first user is proximate a display device of the first collaboration venue.

14. In some embodiments, a non-transitory computer readable medium storing instructions that, when executed by a processor, cause the processor to perform the steps of: receiving sensor information from one or more sensors disposed at a first collaboration venue indicating that a first user is present within the first collaboration venue; receiving sensor information from one or more sensors disposed at a second collaboration venue indicating that a second user is present within the second collaboration venue; identifying the first user based on the sensor information received from the first collaboration venue; identifying the second user based on the sensor information received from the second collaboration venue; and executing one or more actions with respect to a third collaboration venue based on at least one of the information from one or more sensors disposed at the first collaboration venue and the sensor information from one or more sensors disposed at the second collaboration venue.

15. The non-transitory computer readable medium of any of clauses 1-14, wherein the sensor information received from the first collaboration venue is associated with a radio-frequency identification (RFID) badge or a mobile computing device.

16. The non-transitory computer readable medium of any of clauses 1-15, wherein the sensor information received from the first collaboration venue includes one or more of facial recognition data associated with the first user, facial detection data associated with the first user, and body detection data associated with the first user.

17. The non-transitory computer readable medium of any of clauses 1-16, wherein executing one or more actions comprises transmitting a notification to the third collaboration venue that indicates at least one of an identity of the first user and an identity of the second user.

18. The non-transitory computer readable medium of any of clauses 1-17, wherein the sensor information received from the first collaboration venue indicates a location of the first user relative to a display device present within the first collaboration venue, and the notification to the third collaboration venue indicates the location of the first user relative to the display device.

19. The non-transitory computer readable medium of any of clauses 1-18, wherein executing one or more actions comprises causing a display map to be displayed on a display device present within the third collaboration venue that includes a location of the first user within the first collaboration venue and a location of the second user within the second collaboration venue.

20. The non-transitory computer readable medium of any of clauses 1-19, wherein executing one or more actions comprises transmitting a command to a computing device associated with the first collaboration venue to generate responses to user input that are tailored for the first user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing a collaboration environment, the method comprising:
   receiving, during a collaboration, sensor information from one or more sensors disposed at a first collaboration venue indicating that a first user is present within the first collaboration venue;
   receiving, during the collaboration, sensor information from one or more sensors disposed at a second collaboration venue indicating that a second user is present within the second collaboration venue, wherein the second collaboration venue is different from the first collaboration venue;
   identifying the first user based on the sensor information received from the first collaboration venue;
   determining a first authorization level of the first user;
   identifying the second user based on the sensor information received from the second collaboration venue;
   executing one or more actions with respect to particular content generated at a third collaboration venue for display at the first collaboration venue based on the first authorization level of the first user; and
   causing a display map to be displayed on a display device present within the third collaboration venue that indicates the first authorization level of the first user, wherein the display map further includes a first icon indicating a location of the first user within the first collaboration venue, and the indication of the first authorization level of the first user is displayed in or adjacent to the first icon.

2. The method of claim 1, wherein executing the one or more actions further comprises transmitting a notification to the third collaboration venue that indicates at least one of the identification information of the first user and the identification information of the second user.

3. The method of claim 2, wherein the sensor information received from the first collaboration venue indicates a location of the first user relative to a display device present within the first collaboration venue, and the notification to the third collaboration venue indicates the location of the first user relative to the display device.

4. The method of claim 1, wherein the display map further includes a location of the first user within the first collaboration venue and a location of the second user within the second collaboration venue.

5. The method of claim 1, wherein executing the one or more actions further comprises transmitting a command to a computing device associated with the first collaboration venue to generate responses to user input that are tailored for the first user.

6. The method of claim 1, wherein executing the one or more actions further comprises transmitting a command to a computing device associated with the first collaboration venue to display content tailored to the first user.

7. The method of claim 6, wherein the content tailored to the first user includes one or more of a preferred user interface associated with the first user, a particular window layout of assets associated with the first user, and a particular asset associated with the first user.

8. The method of claim 1, wherein the executing one or more actions further comprises:
   determining an authorization requirement for content that is to be displayed at the first collaboration venue;
   determining whether the first authorization level of the first user satisfies the authorization requirement of the particular content that is to be displayed; and
   when the first authorization level of the first user satisfies the authorization requirement, transmitting the particular content to the first collaboration venue for display, or
   when the first authorization level of the first user does not satisfy the authorization requirement, causing the particular content not to be displayed at the first collaboration venue or to be obscured when displayed at the first collaboration venue.

9. The method of claim 8, wherein causing the particular content not to be displayed comprises halting transmission of the particular content to the first collaboration venue or transmitting a command to a computing device associated with the first collaboration venue to halt display of the particular content, and wherein causing the particular content to be obscured when displayed comprises transmitting an obscured version of the particular content to a computing device associated with the first collaboration venue.

10. A system for managing a collaboration environment, the system comprising:
    a memory storing a user and/or location management algorithm; and
    one or more processors that are coupled to the memory and, when executing the user and/or location management algorithm, are configured to:
    receive, during a collaboration, sensor information from one or more sensors disposed at a first collaboration venue indicating that a first user is present within the first collaboration venue;
    receive, during the collaboration, sensor information from one or more sensors disposed at a second collaboration venue indicating that a second user is present within the second collaboration venue, wherein the second collaboration venue is different from the first collaboration venue;
    identify the first user based on the sensor information received from the first collaboration venue;
    determine a first authorization level of the first user;
    identify the second user based on the sensor information received from the second collaboration venue;
    execute one or more actions with respect to particular content generated at a third collaboration venue for display at the first collaboration venue based on the first authorization level of the first user; and
    cause a display map to be displayed on a display device present within the third collaboration venue that indicates the first authorization level of the first user, wherein the display map further includes a first icon indicating a location of the first user within the first collaboration venue, and the indication of the first authorization level of the first user is displayed in or adjacent to the first icon.

11. The system of claim 10, wherein the one or more sensors disposed at the first collaboration venue are configured to communicate with a mobile device proximate the first collaboration venue or read a radio-frequency identification badge associated with the first user.

12. The system of claim 10, wherein the one or more sensors disposed at the first collaboration venue include a biometric sensor.

13. The system of claim 10, wherein the one or more sensors disposed at the first collaboration venue include a proximity sensor that determines when the first user is proximate a display device of the first collaboration venue.

14. One or more non-transitory computer-readable media storing instructions that, when executed by one or more processors, cause the one or more processors to perform the steps of:
receiving, during a collaboration, sensor information from one or more sensors disposed at a first collaboration venue indicating that a first user is present within the first collaboration venue;
receiving, during the collaboration, sensor information from one or more sensors disposed at a second collaboration venue indicating that a second user is present within the second collaboration venue, wherein the second collaboration venue is different from the first collaboration venue;
identifying the first user based on the sensor information received from the first collaboration venue;
determining a first authorization level of the first user;
identifying the second user based on the sensor information received from the second collaboration venue;
executing one or more actions with respect to particular content generated at a third collaboration venue for display at the first collaboration venue based on the first authorization level of the first user; and
causing a display map to be displayed on a display device present within the third collaboration venue that indicates the first authorization level of the first user, wherein the display map further includes a first icon indicating a location of the first user within the first collaboration venue, and the indication of the first authorization level of the first user is displayed in or adjacent to the first icon.

15. The one or more non-transitory computer-readable media of claim 14, wherein the sensor information received from the first collaboration venue is associated with a radio-frequency identification (RFID) badge or a mobile computing device.

16. The one or more non-transitory computer-readable media of claim 14, wherein the sensor information received from the first collaboration venue includes one or more of facial recognition data associated with the first user, facial detection data associated with the first user, and body detection data associated with the first user.

17. The one or more non-transitory computer-readable media of claim 14, wherein executing the one or more actions further comprises transmitting a notification to the third collaboration venue that indicates at least one of an identity of the first user and an identity of the second user.

18. The one or more non-transitory computer-readable media of claim 17, wherein the sensor information received from the first collaboration venue indicates a location of the first user relative to a display device present within the first collaboration venue, and the notification to the third collaboration venue indicates the location of the first user relative to the display device.

19. The one or more non-transitory computer-readable media of claim 14, wherein the display map further includes a location of the first user within the first collaboration venue and a location of the second user within the second collaboration venue.

20. The one or more non-transitory computer-readable media of claim 14, wherein the one or more actions further comprises transmitting a command to a computing device associated with the first collaboration venue to generate responses to user input that are tailored for the first user.

21. The method of claim 1, wherein first content displayed at the first collaboration venue is different than second content displayed at the second collaboration venue.

22. The method of claim 1, further comprising:
determining a second authorization level of the second user; and
executing one or more actions with respect to the particular content generated at the third collaboration venue for display at the second collaboration venue based on the second authorization level of the second user.

23. The method of claim 22, wherein:
the first authorization level of the first user is different than the second authorization level of the second user; and
content displayed at the first collaboration venue is different than content displayed at the second collaboration venue.

24. The method of claim 1, wherein:
the display map further includes a second icon indicating a location of the second user within the second collaboration venue; and
an indication of a second authorization level of the second user is displayed in or adjacent to the second icon.

25. The method of claim 1, wherein the display map further includes at least one of a user name, an employee number, and a profile picture of the first user.

\* \* \* \* \*